United States Patent [19]
Zel'Dovich et al.

[11] Patent Number: 5,956,447
[45] Date of Patent: Sep. 21, 1999

[54] DEVICE AND METHOD FOR IMAGE ACQUISITION THROUGH MULTI-MODE FIBER

[76] Inventors: Boris Y. Zel'Dovich, 3948 Orange Lake Dr., Orlando, Fla. 32817-1638; Maxim A. Bolshtyansky, 12067 Tudor Dr., Orlando, Fla. 32826

[21] Appl. No.: 08/851,423

[22] Filed: May 5, 1997

Related U.S. Application Data

[60] Provisional application No. 60/017,026, May 7, 1996.

[51] Int. Cl.[6] .............................. G02B 6/06; G01J 1/04; G06K 7/10
[52] U.S. Cl. .............................. 385/116; 385/27; 385/28; 385/88; 385/89; 385/133; 250/227.11; 235/462
[58] Field of Search ..................................... 385/115, 116, 385/119, 133, 120, 88, 89, 24, 38, 27, 28; 250/227.11, 227.26; 235/462, 472, 467, 473, 439

[56] References Cited

U.S. PATENT DOCUMENTS

| | | | |
|---|---|---|---|
| 2,825,260 | 3/1958 | O'Brien | 385/116 X |
| 3,437,747 | 4/1969 | Sheldon | 178/6 |
| 3,467,774 | 9/1969 | Bryant | 385/115 X |
| 3,727,030 | 4/1973 | McMurtry | 385/116 X |
| 4,036,218 | 7/1977 | Yamashita et al. | 128/4 |
| 4,166,932 | 9/1979 | Selway | 179/121 R |
| 4,286,145 | 8/1981 | Palmer | 235/454 |
| 4,570,063 | 2/1986 | De Bie et al. | 385/115 X |
| 4,808,815 | 2/1989 | Langley | 250/227.11 X |
| 5,195,151 | 3/1993 | Campbell, Jr. et al. | 385/43 |
| 5,263,110 | 11/1993 | Anderson | 385/117 |
| 5,346,655 | 9/1994 | Blyler, Jr. et al. | 264/1.28 |
| 5,367,527 | 11/1994 | Gruneisen | 372/9 |
| 5,402,966 | 4/1995 | von Hoessle | 244/3.12 |
| 5,404,001 | 4/1995 | Bard et al. | 235/462 |
| 5,446,279 | 8/1995 | Hsu | 250/227.21 |
| 5,463,712 | 10/1995 | Cawood | 385/117 |
| 5,475,777 | 12/1995 | Imoto et al. | 385/28 |
| 5,479,550 | 12/1995 | Nishioka et al. | 385/116 |
| 5,495,541 | 2/1996 | Murray et al. | 385/33 |

*Primary Examiner*—Brian Healy

[57] ABSTRACT

An endoscope for image acquisition via illumination of an object's image, such as but not limited to a bar code, by a set of spatially resolved patterns, with subsequent reconstruction of the image without detailed spatial resolution. A device to stabilize the prescribed set of illuminating patterns against bending of the fiber is also disclosed, which consists of the auxiliary pre-bent part of the fiber and the work part of the fiber, subject to the inevitable bends with or without additional compensation. The distorting influence of the bending of the work part is compensated by the controllable loosening of the pre-bent part of the fiber. Encoding of the pixels of the image or of the illumination patterns encodes the intensity of each pixel to the excitation intensity of the corresponding mode. Such encoding is stable to the bending of the guide. Special transverse profiles of the properties of the waveguide include a rectangular, triangular and hexagonal cross-sectional shaped waveguides, which allow the pixel-to-mode encoding via direct viewing from the open end of the guide.

20 Claims, 12 Drawing Sheets

$R(l)$

Work part $R'(l)$

Displacement of work and pre-bent parts (cm)

90°

60

60° 60°

45°

90° 45°

120° 60°

60° 120°

90°

120°

DEVICE AND METHOD FOR IMAGE ACQUISITION THROUGH MULTI-MODE FIBER

This invention relates to getting pictorial information from a closed space, such as endoscopy, and, in particular to a method and apparatus for image acquisition through a waveguide or optical fiber by encoding and decoding of the transmitted information and by stabilization of that encoding against the deformation of the guide. The subject invention is a Continuation-In-Part of Provisional application Ser. No. 60/017,026 filed on May 7, 1996, pending.

BACKGROUND AND PRIOR ART

Endoscopes and borescopes have been available in medical and industrial applications to get images from spaces closed to direct vision. In a multi-fiber endoscope, the image formed at the input end by an optical system is transmitted to the output end in the form of individual pixels by a bundle of fibers, one resolvable pixel per fiber. In other words, relatively large total thickness of endoscope, about ⅛ to ¼ of an inch is due to large number of the mutually optically isolated fibers. The necessity of the optical system forming the image at the input end of the fiber bundle puts a sufficiently large transverse size requirement on the opening, through which the endoscope is to be inserted into the closed space. Such an endoscope for image transmission through a bundle of individual fibers is shown in U.S. Pat. No. 3,437,747 to E. E. Sheldon and U.S. Pat. No. 5,479,550 by Kimihiko Nishioka et al. to Olympus Optical Co., Ltd, both of which are incorporated by reference.

Furthermore, multi-lens optical endoscopes have a relatively large thickness for the given number of resolvable image pixels, such an endoscope is shown in U.S. Pat. No. 4,036,218 to Olympus Optical Co., which is incorporated by reference.

SELFOC (Self Focussing) and GRIN (Gradient index) waveguides find their use as devices made of one waveguide, where the scrambling of the image by propagation is overcome by the gradient index lensing effect. These endoscopes, apart from having a relatively poor number of resolvable pixels, suffer from the sensitivity to bending of the guide.

Phase-conjugation techniques are known to reconstruct the image which has been blurred by the propagation through an inhomogeneous medium or through a multimode waveguide, by producing "antidistorted" wave and sending the waves back into the medium or waveguide. See for example: B. Ya. Zel'dovich, N. F. Pilipetsky, V. V. Shkunov. *Principles of Phase Conjugation,* monograph, Springer-Verlag, Berlin, 1985, pp. 1–253; B. Ya. Zel'dovich, V. V. Shkunov. *"Optical Phase Conjugation,"* Scientific American, December 1985, v.253, N6, p.54–59; and D.M. Pepper. *"Application of Optical Phase Conjugation,"* Scientific American, January 1986, v.254, N1, p.37–44. Such experiments were successfully done with the fiber. See for example: G. J. Dunning, R. C. Lind. *"Demonstration of image transmission through fibers by optical phase conjugation,"* Opt. Lett., November 1982, v.7, N11, p.558–560. However the reconstructed image has appeared at the "wrong" end of the fiber which was inside the body in the cases of medical applications. It was suggested to send phase conjugate ("antidistorted") wave into an identical fiber situated outside the closed space. See for example: A. Yariv, J. Appl. Phis. Lett. 1975, v.28, p.88. Such an endoscope is shown in U.S. Pat. No. 5,263,110 to Linvatec Corporation, which is incorporated by reference. Another scheme of an endoscope has been suggested, which uses the optical phase conjugating filter in the middle of the fiber, so that the first and the second pieces of fiber should introduce identical distortion due to propagation. See U.S. Pat. No. 5,263,110 by John E. Anderson, et al. to Linvatec Corporation, which is incorporated by reference.

However, the practical impossibility to create two fibers that would produce identical interference transmission patterns, does not allow the above variants of phase conjugate endoscopy. Furthermore, in the process of the actual use of the fiber endoscope, it is usually subject to bends, and that increases the difficulties of creation of a twin fiber with interferometric accuracy.

The definition of the term "mode" of an optical waveguide can be found in technical literature as a specific solution of wave equation that satisfies the appropriate boundary conditions and has the property that its spatial distribution does not change with propagation, see for example G.P. Agrawal, Wiley-Interscience Pub. N.Y., 1997. We define the term "multimode fiber" or the equivalent term "multimode waveguide" as related to a waveguide that can support propagation of more than one confined mode without considerable attenuation. Multimode optical waveguide (multimode fiber) is different from a fiber bundle both with respect to manufacturing procedure and with respect to the structure.

Fiber bundles are made by parallel arrangement of many individual fibers, typically identical multimode or single-mode fibers. The structure of propagating optical waves in fiber bundles is characterized by very good localization of individual light pixel inside an individual fiber. This is achieved by separation of the cores of the different fibers via claddings that have a smaller refractive index. Multimode waveguides are typically manufactured by longitudinal drawing of a single perform. The localization of the optical waves(modes) in a multimode waveguide is characterized by sharing the space of the optical core by all the modes.

The necessity of much thinner endoscopes, to sustain the number of resolvable pixels being characteristic to existing multimode endoscopes, is governed by the requirement for less invasive techniques for safe penetration through human bones and other tissues, as well as through the walls of containers with hazardous materials.

Several U.S. patents have suggested using the outer shape of the fiber's cladding of a rectangular or square form. See for example: U.S. Pat. Nos. 5,346,655 to Lee L. Blyler, et al. and 5,402,966 to Wolfgang von Hoessle, et al., which are both incorporated by reference. However, the function of this form which is the cladding and not the fiber itself deals with mechanical and geometrical properties of the fibers, and not with the optical properties.

Other U.S. patents deal with the use of waveguides as sensor-transmitters of one signal. See for example: U.S. Pat. Nos. 5,446,279 to Tsung-Yuan Hsu et al. and 4,166,932 to Selway et al., which are incorporated by reference. None of these devices are for image transmission and acquisition.

SUMMARY OF THE INVENTION

The first object of the present invention is to provide a method for image acquisition through a multimode fiber.

The second object of the present invention is to provide a method for stabilization of the transmission mapping function of the waveguide.

The third object of the present invention is to provide a method for collection of image bearing signals in conditions when the photodetector provides no spatial resolution.

The fourth object of the present invention is to provide a method for achieving spatial resolution via illumination of the object by a fixed set of speckle patterns.

The fifth object of the present invention is to provide a method for scanning of the object by an illuminating beam.

The sixth object of the present invention is to provide for bending-insensitive image transmissions via pixel-to-mode encoding and decoding.

The seventh object of the present invention is to provide for bending-insensitive scanning of the object via pixel-to-mode encoding.

The eighth object of the present invention is to use a rectangular shaped waveguide for image transmission and acquisition.

The invention includes the positioning of a specially prepared multimode optical waveguide between an object and an observer. A light beam is directed into the fiber through the observer's end of the fiber. The transverse structure of the light beam is controlled by a computer and other devices such as but not limited to rotating mirrors, spatial light modulators, holograms, and the like in order to provide the necessary fixed set of the patterns for illumination of the object. The portion of light scattered or reflected by the object is registered by a photodetector, and the photoelectric signal is then processed for image reconstruction. Direct observation of the object's image at the observer's end of the waveguide is another variant of image acquisition, and is accomplished with a novel fiber design which provides stable encoding of the image by ascribing the intensities of individual pixels of the image to the intensities of individual modes of the fiber.

Further objects and advantages of this invention will be apparent from the following detailed description of a presently preferred embodiment which is illustrated schematically in the accompanying drawings.

DESCRIPTION OF THE PREFERRED EMBODIMENTS

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The novel invention overcomes the obstacles encountered in creating a one-waveguide endoscope. These obstacles include: (1) intermixing of rays in the waveguide due to diffraction and interference in the process of propagation and multiple reflection from the core walls; (2) sensitivity of transmission mapping function to bending of waveguide; and (3) low intensity of light, bearing information about one pixel of image been transmitted to the observer through the waveguide.

Figure 1:
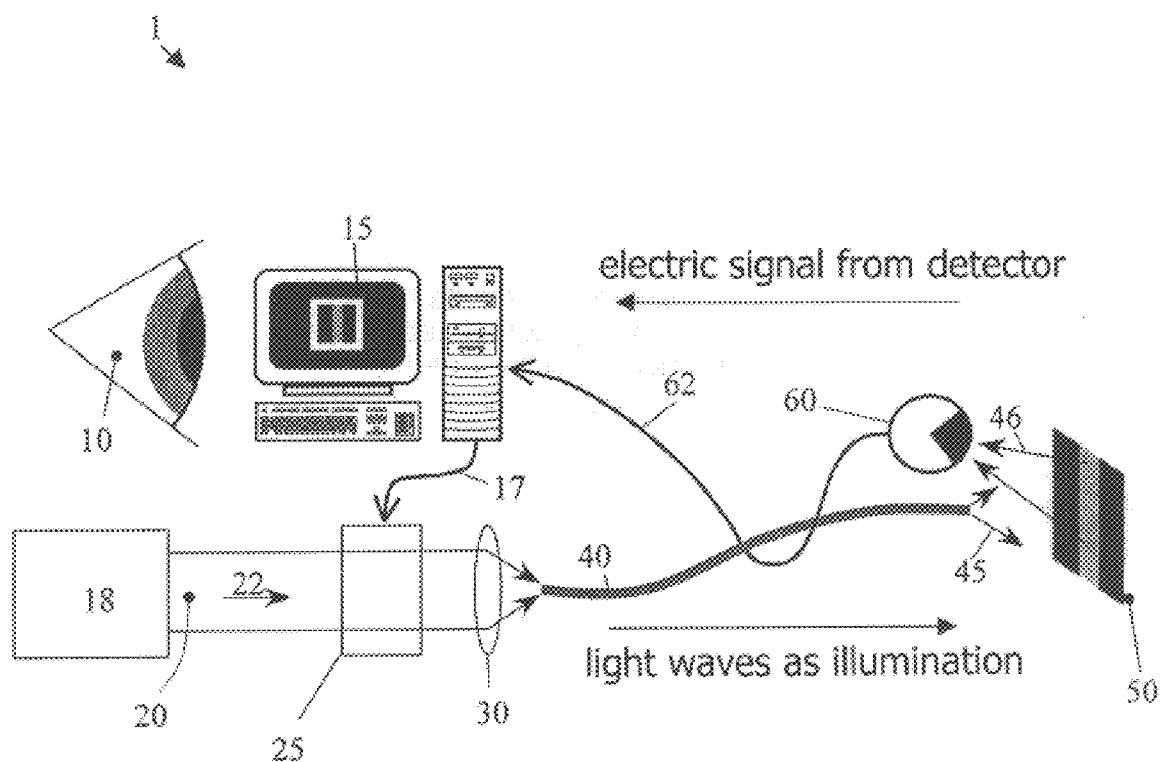
FIG. 1 shows a component configuration of image acquisition with photoelectric collection of the signal.

FIG. 1 shows a component configuration 1 of image acquisition with photoelectric collection of the signal. Referring to FIG. 1, arrow 22 shows the direction of an emitted light beam from a light source 18 such as but not limited to an Argon Ion Laser emitting a green wavelength of approximately 514.5 nm. Emitted light beam 20 passes through a Spatial Light Modulator (SLM) 25 such as but not limited to a rotating mirror which is used to change the transverse distribution of light. Alternatively, SLM 25 can be a liquid crystal (LC). Convex lens 30 can have a focal length of approximately 5 cm which focuses the light onto optical waveguide 40, such as a single 3M FG 100-GLA optical fiber. Light 45 illuminates an object 50 that the observer 10 wants to view, such as a bar code, and the like. Photodetector 60 is used to convert the reflected and scattered light 46, coming from the illuminated object 30 and converts the light 46 to electricity which is then passed along line 62 as current $i_n$ for processing by a computer 15, such as an IBM P6, and the like. Photodetector 60 can be positioned either adjacent to the object's end of the waveguide 40 as in FIG. 1 or adjacent to observer's end, of the optical fiber waveguide 40.

Figure 2A:
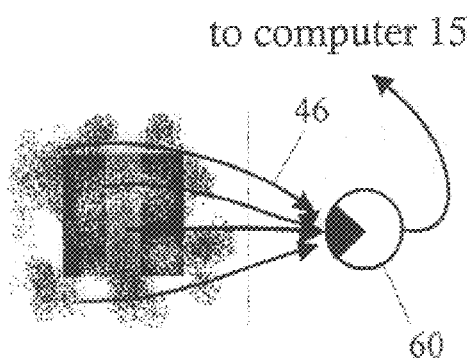
FIGS. 2a and 2b shows the illumination of an object by two different speckle patterns and the collection of the scattered light by photodetector.
Figure 2B:
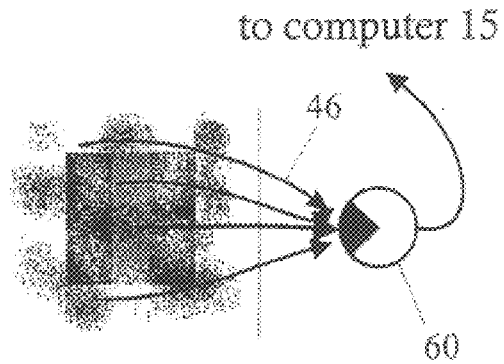

The spatial resolution of the object's image is achieved via illumination 45 of the object 50 by a fixed set of spatially inhomogeneous patterns, such is shown in more detail in FIGS. 2a–2b. Those patterns are generated via such as but not limited to spatial light modulator 25 on FIG. 1, or via rotating mirrors, or via illumination of pre-recorded hologram by a prescribed set of reference waves.

FIGS. 2a–2b, respectively, shows two possible realizations, $I^{(1)}(x,y)$ and $I^{(2)}(x,y)$, of spatially inhomogeneous illuminating patterns $I^{(n)}(x,y)$, where n=1, 2 ..., N is the index of an individual illuminating pattern $I^{(n)}(x,y)$ of total number N of the set of prescribed speckle-patterns. The light, 45, is reflected with different local coefficient R(x,y) from different areas of the object 50, so that the intensity of reflected and scattered light as collected by photodetector 60 is given by the expression for the photocurrent signal in equation (1).

$$i^{(n)} = \int\int R(x,y) I^{(n)}(x,y) dx\, dy. \quad (1)$$

where:
- i=photocurrent in miliamps (i.e. in mA);
- n=1 ... N
- R(x,y)=reflectivity of object 50
- x=transverse distance coordinate (i.e. in mn)
- y=transverse distance coordinate (i.e. in mm)
- I(x,y)=Intensity of the light of object 50 (i.e. Watts per $cm^2$)

The algorithm for reconstruction of the image from the $i^{(n)}$-data can be found in the paper by the subject inventors: M. A. Bolshtyansky, B. Ya. Zel'dovich, "Transmission of the image signal with the use of a multimode fiber," Optics Communication, 123, 629–636 (1996); "*Random transverse tomography and phase conjugate scanning for image acquisition through a multimode fiber,*" Opt. Eng. 35(3), 769–774 (1996); "*Making ultrathin endoscope of one multimode fiber: 2. Encoding and decoding of the optical field,*" Advances in Optical Imaging and Photon Migration, technical digest, pp. 156–158 (1996). The algorithm can be but is not limited to the following equations (2) and (3).

$$R(x, y) = A \sum j^{(n)}(x, y)\alpha^{(n)} + B, \quad (2)$$

$$j^{(n)}(x, y) = \frac{I^{(n)}(x, y) - \langle I \rangle}{\sqrt{\langle (I^{(n)} - \langle I \rangle)^2 \rangle}} \quad (3)$$

Where:
- A=some constant real number (i.e. reflecting brightness of the object 50)
- B=some constant positive real number that allows R(x,y) to be a positive number.
- R=as is previously defined.
- α=as is defined in equation (4) below.

The operation of averaging over the whole object 50 area is denoted by brackets <,>. Adjustment of the background constant B is provided to achieve better visual quality of the image. The coefficients $\alpha^{(n)}$ can be calculated from an equation such as but not limited to equation (4).

$$\alpha^{(n)} = \frac{i^{(n)} - \langle i \rangle}{\sqrt{\langle (I^{(n)} - \langle I \rangle)^2 \rangle}} \quad (4)$$

Figure 3:
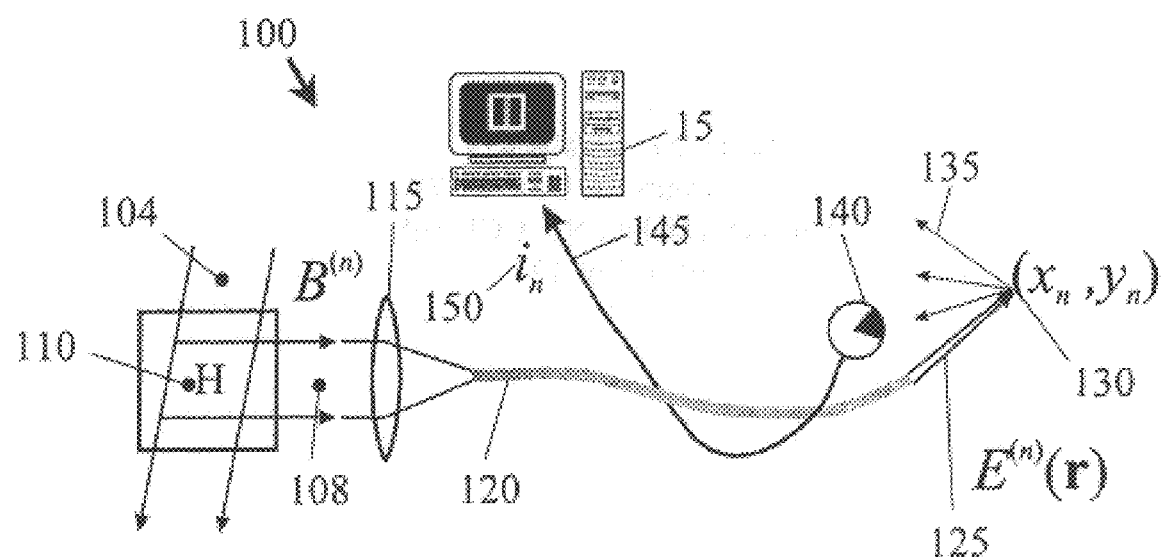
FIG. 3 shows the scanning of the different points $(x_n, y_n)$ of an object via illumination of the observer's end of the optical fiber with the use of phase conjugating hologram H.

The specific variant of illumination is the raster-type or TV-type scanning of object 50 by the set of patterns, each pattern has been sharply concentrated to an individual point $(x_n, y_n)$ in the object space shown in FIG. 3. Referring to FIG. 3, arrows 104 refer to nth reference beam $B^{(n)}$ which reconstruct the beam 108 passing through a hologram 110. Beam 104 can be emitted from an Argon Ion Laser emitting a green wavelength of approximately 514.5 nm such as the one described in reference to FIG. 1. Reconstructed beam 108 goes directly into multimode optical fiber 120 or passes to a focussing lens 115 having a focal length of approximately 5 cm to approximately 20 cm. Lens 115 focuses beam 108 into multimode optical fiber 120 such as a single 3M FG-100 GLA optical fiber. Light beam 125 emitted from optical fiber 120 illuminates object 50 (show in FIG. 1). Light 135 scattered and reflected from objects point 130 is picked up by photo detector 140 which converts light to electricity and passes along wire 145 photocurrent 150 $i_n$ to a computer 15 described previously in reference to FIG. 1. The operation of FIG. 3 further functions similarly to that of FIG. 1.

A set of patterns (each pattern being sharply concentrated to an individual point $(x_n, y_n)$ and function similar to that of FIGS. 2a–2b ) for FIG. 3 can be achieved via illumination of the properly pre-recorded hologram H by a set of corresponding reference waves $B^{(n)}$. Preparation of the hologram H 110 by a set of corresponding reference waves $B^{(n)}$. Preparation of the hologram H 110, 210 is shown in FIG. 4 and is achieved by the multiple (n=1, . . . , N) recording of interference between the reference beam $\tilde{B}^{(n)}$ 204 which in is phase conjugate to the reference beam $B^{(n)}$ 104 and the radiation, 208 initially emitted from the point $(x_n, y_n)$ in the object space into the direction 225 of the fiber 220 and transmitted through the latter.

Figure 4:
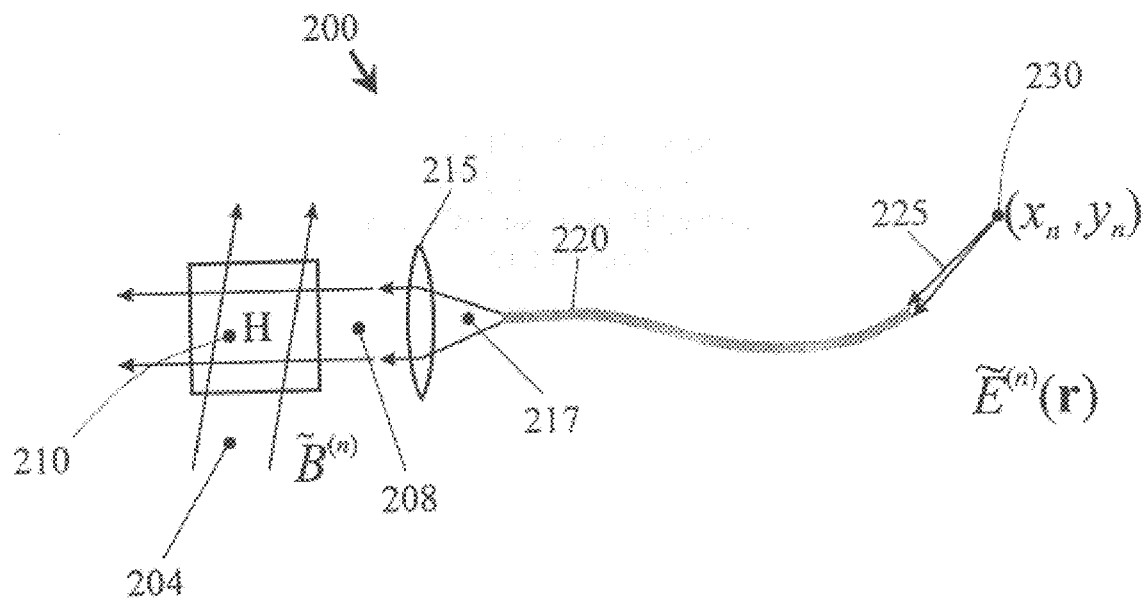
FIG. 4 shows the preparation stage when the hologram H is recorded by interference of reference wave $\vec{B}(n)$, and the field originated at the pixel $(x_n, y_n)$ of the object and transmitted through the optical fiber.

FIG. 4 shows the preparation stage 200 when the hologram H, 210 is recorded by interference of reference wave $\tilde{B}^{(n)}$, and the field originated at the pixel 230, and transmitted through the optical fiber 220. Pixel 230 can be a pixel source of light such as an Argon Ion Laser emitting a green wavelength of approximately 514.5 nm, which is described in reference to FIGS. 1 and 3 above. Referring to FIG. 4, pixel 230 emits light in the direction of arrow 225 to optic fiber 220 lens 215 receives signal 217 and passes along the direction of arrow 208 into Hologram 210. Fiber 220, lens 215, and Hologram 210, are identical to similar components 120, 115, and 110 as discussed in reference to FIG. 3 above.

Figure 5A:
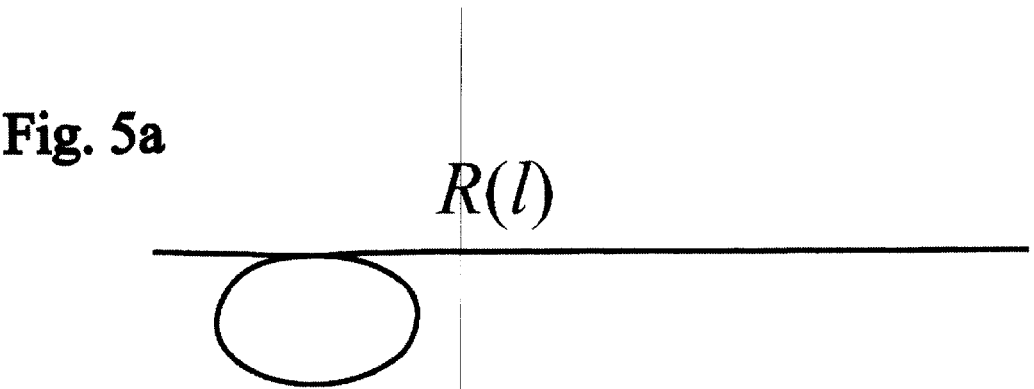
FIG. 5a shows the waveguide configuration with pre-bent auxiliary part and straight work part.

The preparation process in FIG. 4, can be done by the configuration of the fiber shown in FIG. 5a, which gives the transmission mapping function to be stabilized.

The preparation stage takes place before the observation process starts. The process of the reconstruction allows a time-reversed or phase conjugated sharply concentrated optical beam after the backward propagation through the same fiber, which was used at the preparation stage.

Figure 5B:
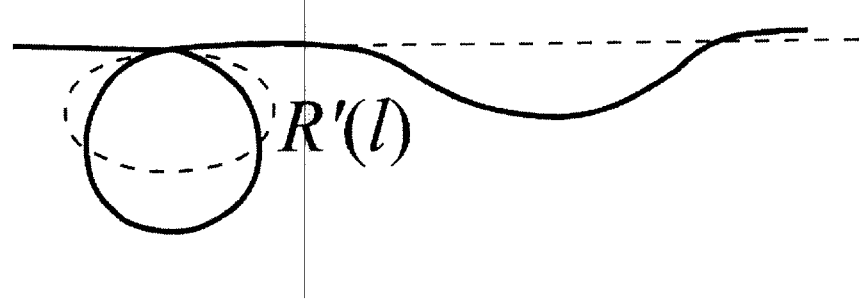
FIG. 5b shows the example of technique to stabilize the transmission mapping function against the influence of bending of the work part of the optical fiber by controlling the shape of the auxiliary part of the optical fiber.

Distorting influence of the bending of the work part of the fiber, bending been shown at FIG. 5b, can be compensated, by the controllable change of the spatial profile of the pre-bent auxiliary part of the fiber shown at FIGS. 5a and 5b.

The use of stabilization scheme shown in FIGS. 5a–5b is not limited to the method of phase conjugated scanning disclosed above, but can be applied to all other methods, including the method of illumination of the object by a fixed set of random speckle-patterns.

An experimental demonstration of the performance of the stabilization scheme was shown with the pre-bent loop loosening. See D. Z. Anderson, M. A. Boshtyansky, B. Ya. Zel'dovich, "Stabilization of the speckle pattern of a multimode fiber undergoing bending," Optics Letters 21(11), 785–786 (1996). "Making ultrathin endoscope of one multimode fiber: 1. Stabilization of transmission function," Advances in Optical Imaging and Photon Migration, technical digest, pp. 68–70 (1996).

Figure 5C:
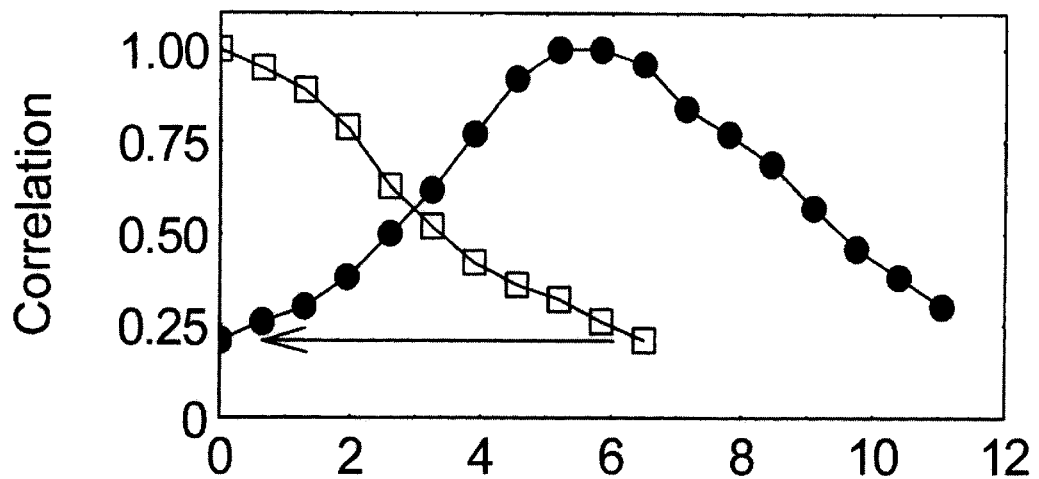
FIG. 5c shows the experimental data on distortional decorrelation of the transmission mapping function due to bending of the work part of the fiber (empty squares) and restoration of the correlation via loosening the pre-bent part of the fiber (filled circles) in correlation verses displacement in cm.

FIG. 5c shows the decrease of the correlation between the original field and the distorted due to bending of the work part of the fiber, open squares at the graph. Solid circles show the compensation of the distortion, and hence, the stabilization of transmission function, due to loosening the loop in the pre-bent part of the fiber.

Figure 6:
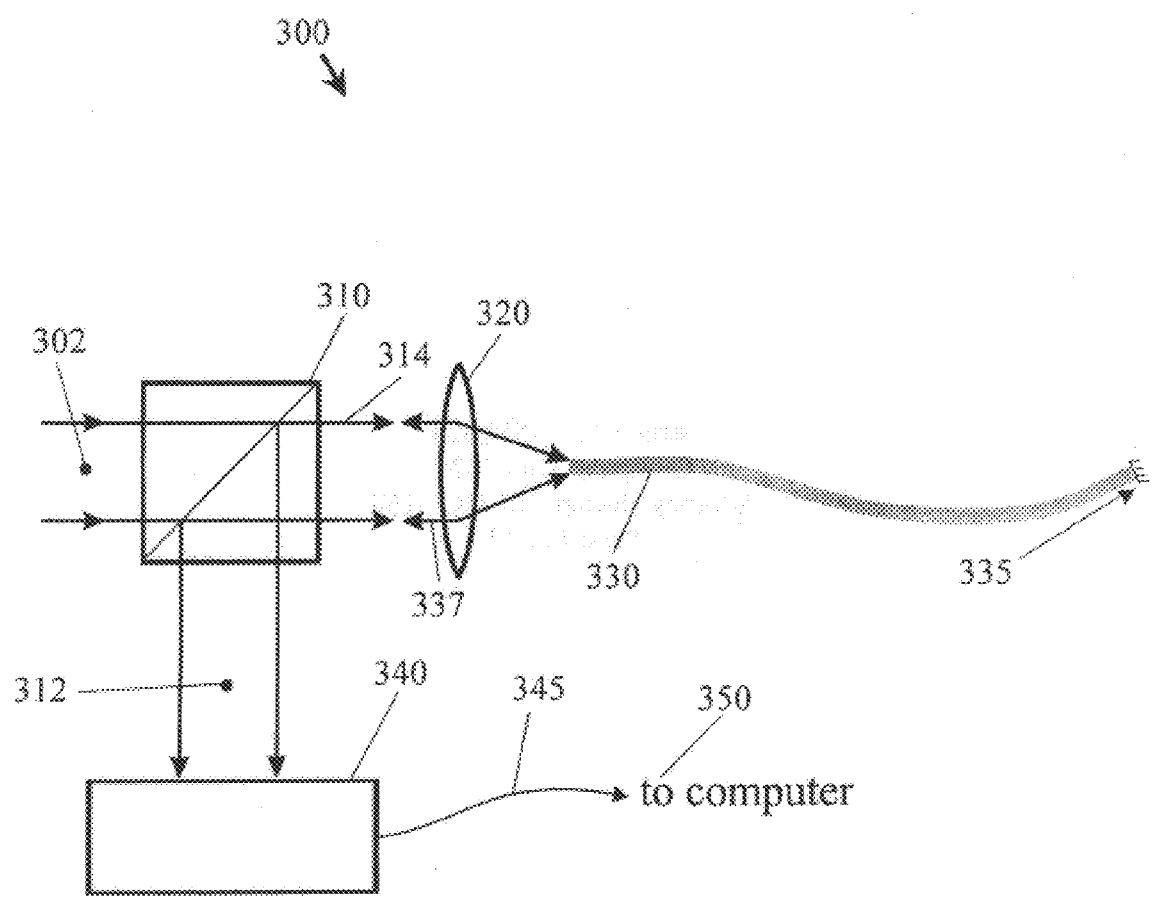
FIG. 6 shows a component configuration for the extraction of information about the distortion of transmission mapping function.

The control of the stabilization of the transmission mapping function can be achieved such as but not limited to the reflection of some part of illuminating light from the object's end of the fiber or part of that region, FIG. 6.

FIG. 6 shows a component configuration 300 for the extraction of information about the distortion of transmission mapping function. Referring to FIG. 6, light beam 302 can be an Argon Ion Laser emitting a green wavelength of approximately 514.5 nm such as the light sources described in reference to FIGS. 1, 2 and 4. Light beam 302 passes through beam splitter 310 at 314 to focussing lens 320, which focuses light beam 314 into optical fiber 330. Semi-transparent mirror 335 reflects the light back through fiber 330 and into lens 320 where a light beam 337 enters beam splitter 310 which splits a portion to beam 312 into photo detectors 340 and then delivered as a signal 345 to computer 350. The components used in FIG. 6, correspond to similar components in the previous described embodiments.

Another variant of the preferred embodiment is the special encoding of the light wave to be transmitted. This is encoding of the intensity of an individual pixel of the object space into the intensity of the corresponding mode of the fiber. This scheme of encoding allows one to have stable transmission function of an individual pixel's intensity even without stabilization of end-to-end transmission function. Preservation of the intensity of individual mode is guaranteed in conditions of smooth bendings, when the bend-induced mixing between modes is negligible.

Figure 7A:
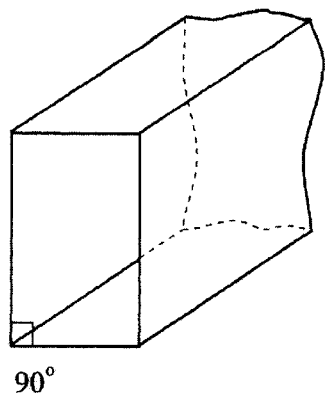
FIGS. 7a, 7b, 7c, 7d, 7e and 7f show examples of transverse profiles of waveguides enabling direct pixel-to-mode encoding.
Figure 7B:
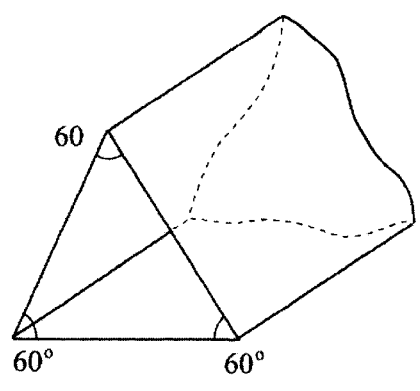
Figure 7C:
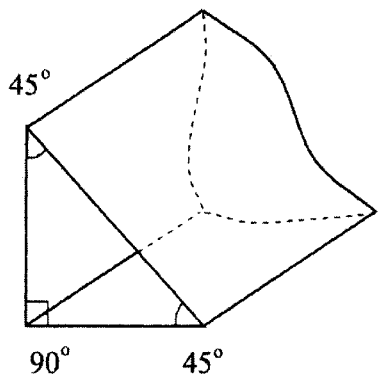
Figure 7D:
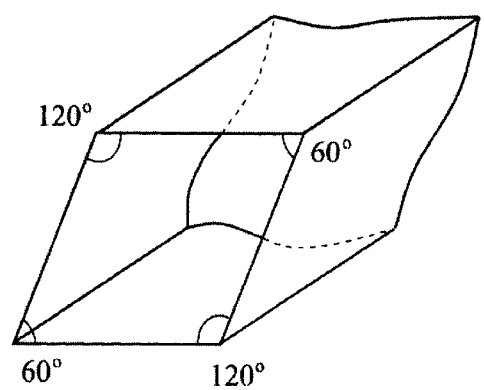
Figure 7E:
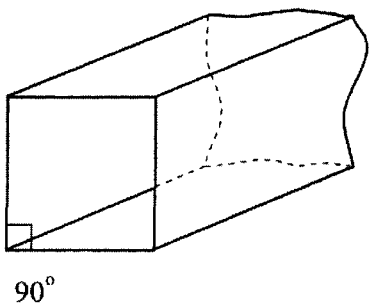
Figure 7F:
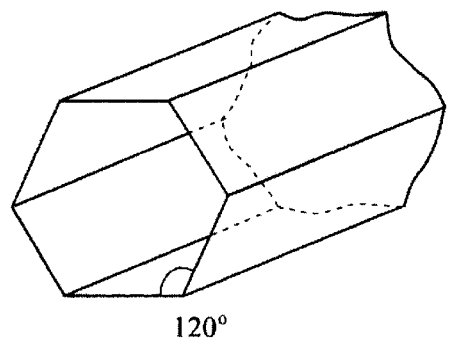

In this variant of preferred embodiment the particular transverse profiles of the waveguide's core, that provide the encoding of an individual pixels of the object's and observer's far field zone, i.e. of ray's angles, into an individual modes, are such as but not limited to a rectangle FIG. 7a, a square FIG. 7e, an equilateral triangle FIG. 7b, right-angled isosceles triangle FIG. 7c, a rhombi with 60° acute angle FIG. 7d, a square FIG. 7e a perfect hexagon FIG. 7f. FIGS. 7a–7e represent cross-sectional profiles of optical fiber core that can be used with the subject invention.

Figure 8:
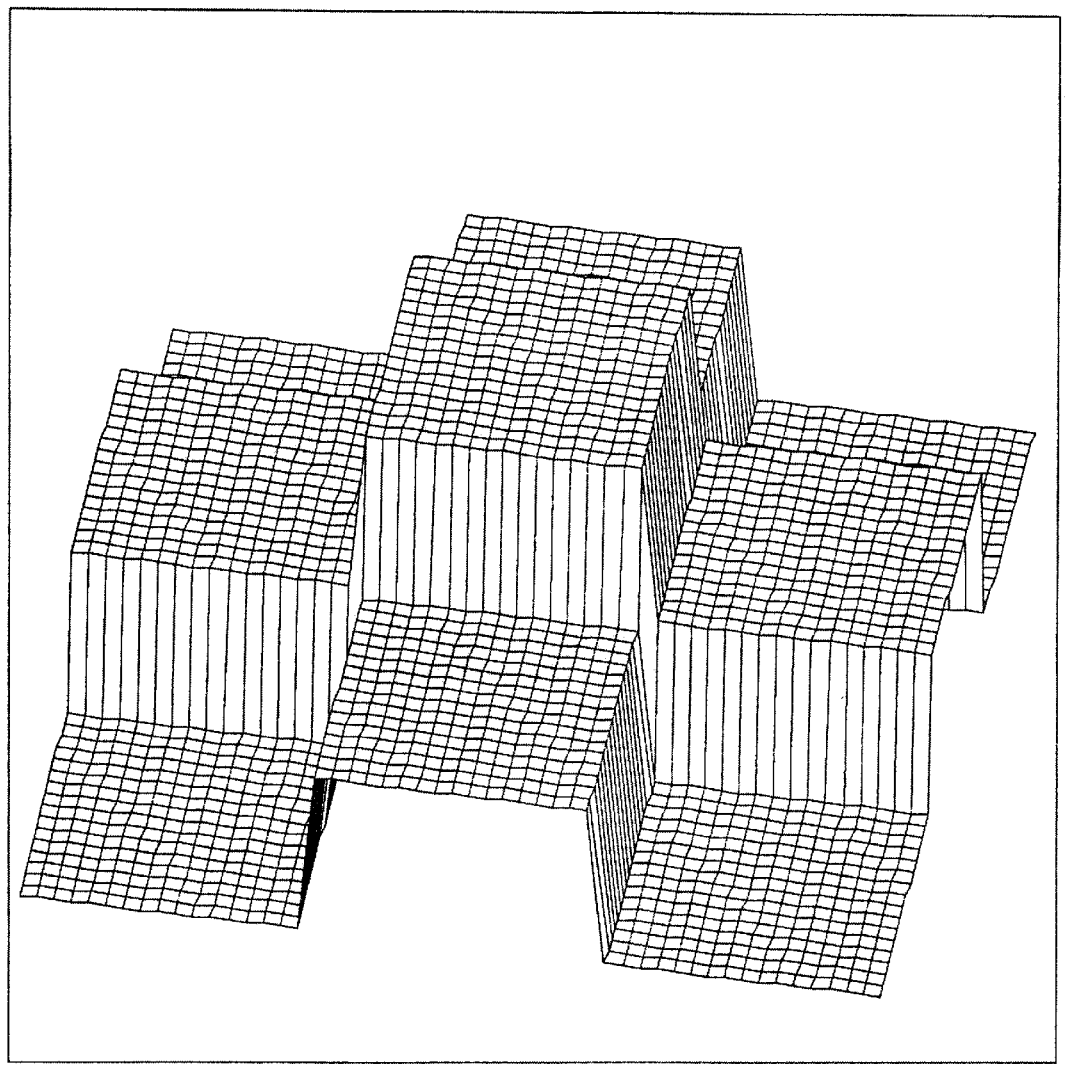
FIG. 8 shows an example of a transverse profile of dielectric permittivity($\epsilon$) of the optical fiber with separation of variables.

This type of encoding sustains imaging from far field input to far field output since, due to Heron's law, incidence and reflection angles being equal. This statement on the structure of mode in a rectangular step-profile waveguide is valid in wave-optical description of the modes as well. Preferred profile of dielectric permittivity $\epsilon(x,y)$ of the waveguide may be such as but not limited to the profile shown at FIG. 8, with separation of variables, $\epsilon(x,y) = \epsilon_0 \cdot g(y)$.

Encoding of the far-field zone pixels into modes results in multiplexing of input and output patterns. One pattern seen from original direction and others as imaged in effective mirrors provided by the boundaries of optical core. All the optical fiber core shapes shown in FIGS. 7a–7e can be used. An example using the optical fiber core shape of FIG. 7e will now be described in reference to FIGS. 9a and 9b.

Figure 9A:
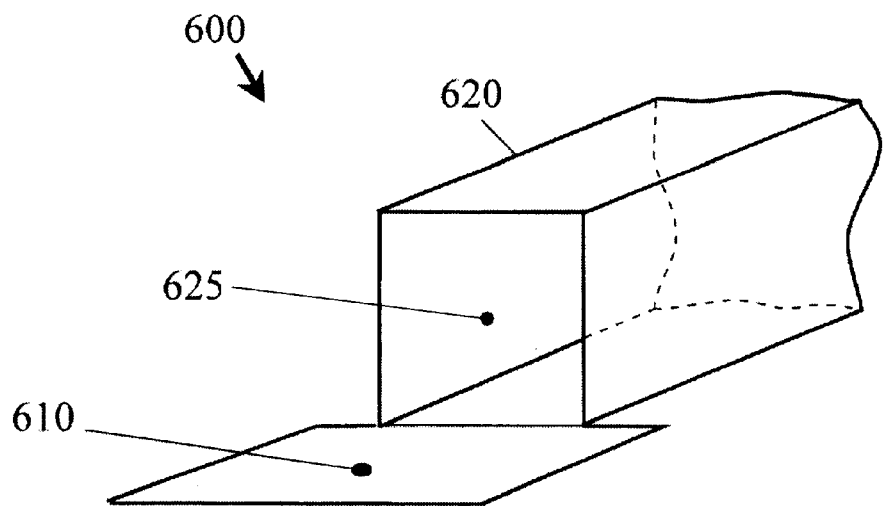
FIGS. 9a and 9b show additional mirrors at the ends of a waveguide to provide efficient transformation of pixels into modes and back.
Figure 9B:
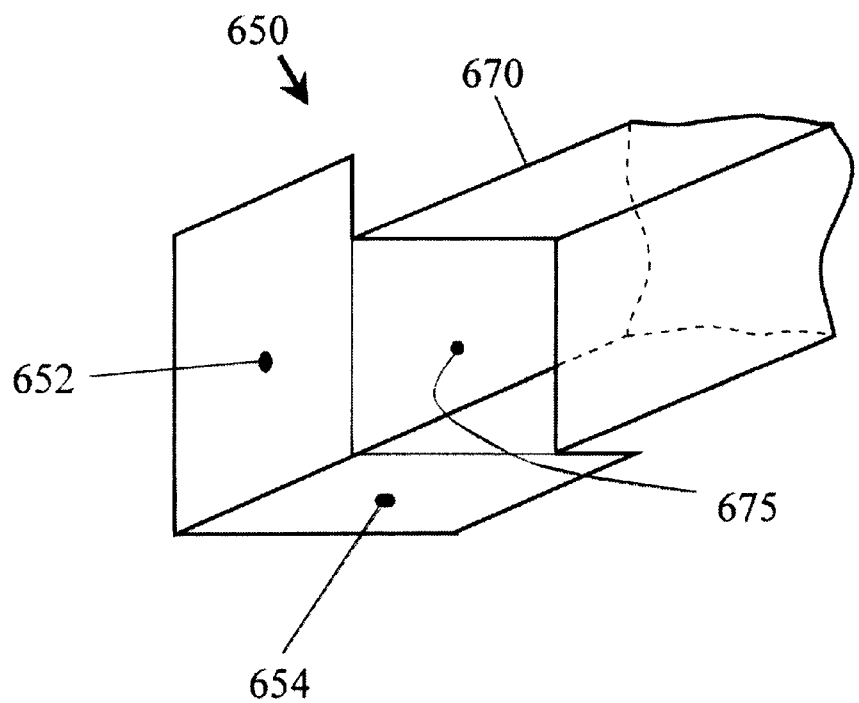

The number of multiplexed images is diminished using one or several mirrors as shown in FIGS. 9a–9b. Those mirrors, being parallel to the optical core boundaries, limit the field of view and redirect additional rays from the given far-field pixel into the same mode, as well as redirect additional fraction of modal energy into corresponding pixel of the image. In the embodiment 600 of FIG. 9a, mirror 610 is positioned at the end 625 of optical fiber 620. In the embodiment 650 of FIG. 9b, two mirrors 652, 654 can be placed perpendicular to the end 675 of optical fiber 670.

Figure 10A:
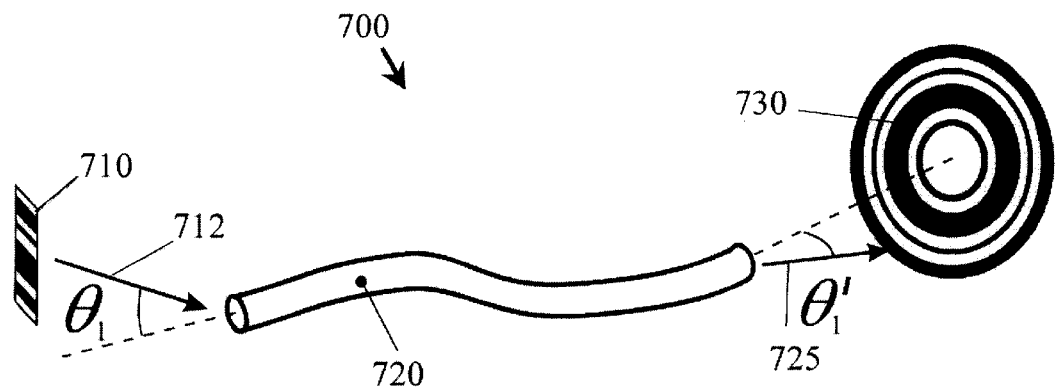
FIG. 10a shows a scheme for the transmission of the image of a one-dimensional pattern through an axially symmetric flexible tubular waveguide.

Another variant of pixel-to-mode encoding consists in the device for the transmission of one-dimensional information via it's encoding into the modes, which differ by only one parameter. The preferred embodiment 700 shown in FIG 10a consists in the axially-symmetric step-index-profile fiber 720, where the angle $\theta 1$ of the modal ray 712 in respect to fiber's axis is conserved during propagation inside the straight optical fiber 720. This angle $\theta 1$ is also preserved in conditions of smooth bending of tubular fiber, as shown at FIG. 10a. Another embodiment comprises a planar waveguide: straight or flexible planar waveguide in FIG. 10b. Propagation in a planar waveguide 770 results in transmission of the image 780 of one-dimensional patterns 760, as shown at FIG. 10b, the angle of the ray $\theta 2$ to the guide's plane is preserved in the process of propagation.

Figure 10B:
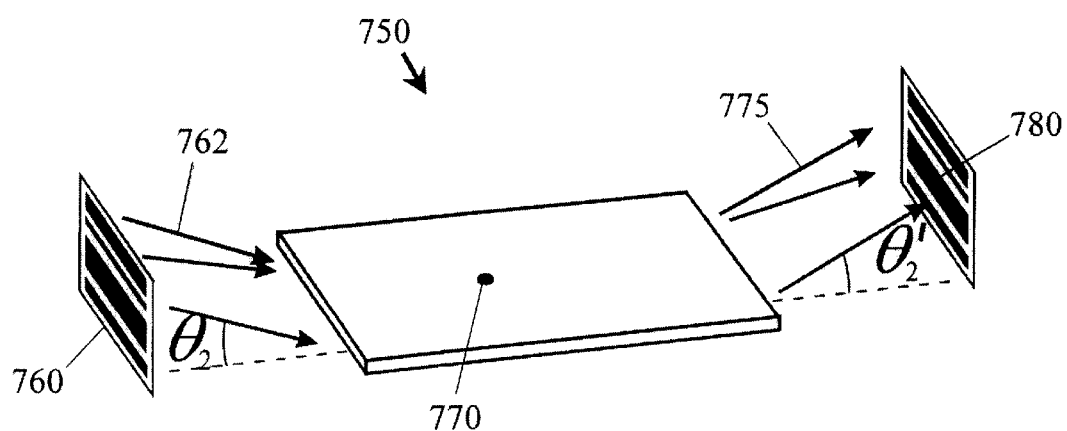
FIG. 10b shows a scheme for the transmission of the image of a one-dimensional pattern through a planar waveguide.

In FIGS. 10a and 10b only the image of bar codes 710, 760 passes through optical fiber 720 and 770, respectively. FIG. 10a shows a one dimensional picture of a horizontal striped pattern of various thickness strips, for example a bar code. Light from the bar code passes in the direction of arrow 712 at angle $\theta 1$ (to the axis of the fiber 720). At the output, the bar code becomes an image 730 of concentric circles having the same strip thickness and position at the bar code picture 710. The angles $\theta 1$ and $\theta 1'$ 725 at both ends are equal. For example, if $\theta 1=30$ degrees, $\theta 1'=30$ degrees. The planar optical waveguide 770 of FIG. 10b allows the one dimensional horizontal striped pattern(bar code) picture 760 to be recreated by passing therethrough and whose image appears at 780. The angles $\theta 2$ 762 and $\theta 2'$ 775 at both end are also equal. Although bar codes 710 and 760 are shown, any one dimension picture can be used.

Propagation of rays in respect to the coordinate parallel to the guides plane, is governed by the same laws as in homogeneous medium. Therefore the embodiment of the device to transmit and/or to acquire two-dimensional images through a planar multimode waveguide further comprises a cylindrical optical system to provide imaging in respect to the in-plane transverse coordinates, while the imaging in respect to the angles perpendicular to the guide's plane is provided by pixel-to-mode encoding, as shown at FIG. 11.

Figure 11:
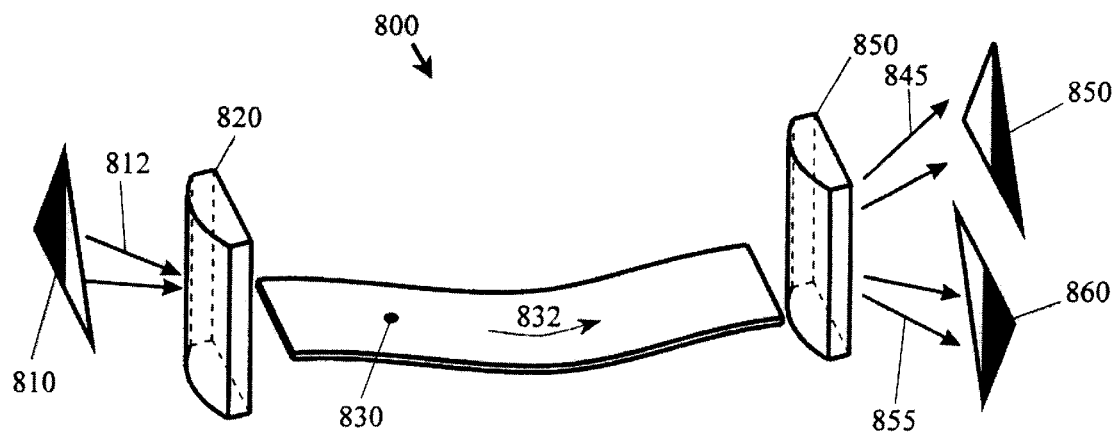
FIG. 11 shows a scheme of the transmission of a two-dimensional image through a planar waveguide.

Referring to FIG. 11, a two dimensional image 810 (such as but not limited to a human photograph, and the like) emits light in the direction of arrow 812 to a cylindrical lens 820 which focuses light 812 in one dimension to a bent planar optical waveguide 830 along the direction of arrow 832. A second cylindrical lens 840 converts light from waveguide 830 into light beams 845 and 855 which gives two inverse two dimensional images 850 and 860. For example, image 850 can be the opposite mirror reflection of image 810 and image 860 can be the upside down image of original image 850.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An endoscopy apparatus for acquisition of an object's image through a single optical multimode fiber waveguide, comprising:

a single optical multimode fiber waveguide for transmission of waves to an object;

means for producing a fixed set of optical patterns at an observer's end of the waveguide;

a detector means for measuring light intensity from an object, without spatial resolution; and means for processing the image of the object based on the fixed set of the optical patterns.

2. The endoscopy apparatus of claim 1, wherein the detector means includes:

a photodetector positioned adjacent to an end of the waveguide that is adjacent to the object, the photodetector directly collecting the light scattered by the object.

3. The endoscopy apparatus of claim 1, wherein the detector means includes:

a photodetector positioned adjacent to an observer's end of the waveguide, to collect the light scattered by the object and transmitted back to the observer through waveguide.

4. The endoscopy apparatus of claim 1, wherein the fixed set of optical patterns includes:

a set of random speckle-fields, produced via illumination of an observer's end of waveguide by a controllable set of spatially independent waves.

5. The endoscopy apparatus of claim 1, wherein the fixed set of optical patterns includes:

a set of waves sharply concentrated on individual pixels in the object space, wherein the sharp concentration of the illuminating pattern in the object space is achieved by phase-conjugate reconstruction of a hologram at the observer's end of the waveguide.

6. The endoscopy apparatus of claim 1, wherein the object includes:

a bar code.

7. A method for transmission of a wave with pictorial information through a single optical multimode fiber waveguide comprising the steps of:

(a) encoding the intensity of each pixel of an image via the intensity of a corresponding mode in a single optical multimode fiber waveguide as a signal;

(b) transmitting the signal through the optical waveguide; and (c) decoding the transmitted signal back into corresponding pixels of the image.

8. The method for transmission of pictorial information of claim 7, wherein the single optical multimode fiber waveguide includes:

a core having a square cross-sectional shape.

9. The method for transmission of pictorial information of claim 7, wherein the single optical multimode fiber waveguide includes:

a core having a rectangular cross-sectional shape.

10. The method for transmission of pictorial information of claim 7, wherein the single optical multimode fiber waveguide includes:

a core having an equilateral triangle cross-sectional shape.

11. The method for transmission of pictorial information of claim 7, wherein the since optical multimode fiber waveguide includes:

a core having a right-angled isosceles triangle cross-sectional shape.

12. The method for transmission of pictorial information of claim 7, wherein the single optical multimode fiber waveguide includes:

a core having a hexagon cross-sectional shape.

13. The method for transmission of pictorial information of claim 7, wherein the single optical multimode fiber waveguide includes:

a core having a rhombi having an approximately 60° acute angle cross-sectional shape.

14. The method for transmission of pictorial information of claim 7, wherein the single optical multimode fiber waveguide includes:

a core having a planar waveguide for encoding one dimension of the image.

15. The method for transmission of pictorial information of claim 7, further including:

a mirror positioned at one end of the single optical multimode fiber waveguide parallel to the waveguide axis.

16. The method for transmission of pictorial information of claim 7, further including:

two mirrors positioned at one end of the single optical multimode fiber waveguide parallel to the single optical multimode fiber waveguide axis and perpendicular to each other.

17. The endoscopy apparatus of claim 1 further comprising:

means for stabilizing a transmission mapping function of the single optical multimode fiber waveguide.

18. The endoscopy apparatus of claim 17, wherein the stabilizing means further includes:

means for pre-bending of an auxiliary portion of the single optical multimode fiber waveguide; and means for controllably changing the pre-bending of the auxiliary portion of the single optical multimode fiber waveguide to compensate effects of bending other portions of the single optical multimode fiber waveguide.

19. The method for transmission of pictorial information of claim 7, wherein the image includes:

a bar code.

20. A method for stabilization of a transmission mapping function of a multimode waveguide comprising the steps of:

(a) pre-bending an auxiliary portion of a multimode waveguide;

(b) memorizing selected parameters of a transmission function to be stabilized; and (c) controllably changing the shape of the pre-bent auxiliary portion of the multimode waveguide to compensate for effects of bending additional portions of the multimode waveguide.

* * * * *

UNITED STATES PATENT AND TRADEMARK OFFICE
CERTIFICATE OF CORRECTION

| | | |
|---|---|---|
| PATENT NO. | : 5,956,447 | Page 1 of 1 |
| DATED | : September 21, 1999 | |
| INVENTOR(S) | : Zel ' Dovich, Boris Y. and Bolshtyansky, Maxim A. | |

It is certified that error appears in the above-identified patent and that said Letters Patent is hereby corrected as shown below:

<u>Title page,</u>
Insert item -- [73] Assignee: University of Central Florida, Orlando, FL (US) --; and
Item -- [74] *Attorney, Agent, or Firm* Brian S. Steinberger --

Signed and Sealed this

Seventeenth Day of December, 2002

JAMES E. ROGAN
*Director of the United States Patent and Trademark Office*